(12) United States Patent
Dayal et al.

(10) Patent No.: US 10,912,281 B2
(45) Date of Patent: Feb. 9, 2021

(54) SYSTEMS AND METHODS FOR COMMUNICATING WITH A GUIDE ANIMAL

(71) Applicant: Toyota Motor Engineering & Manufacturing North America, Inc., Erlanger, KY (US)

(72) Inventors: Rajiv Dayal, Milpitas, CA (US); Fredrick W. Mau, II, McKinney, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1003 days.

(21) Appl. No.: 15/052,495

(22) Filed: Feb. 24, 2016

(65) Prior Publication Data
US 2017/0238509 A1 Aug. 24, 2017

(51) Int. Cl.
*A01K 15/02* (2006.01)
*A01K 27/00* (2006.01)
(Continued)

(52) U.S. Cl.
CPC .......... *A01K 27/009* (2013.01); *A01K 15/021* (2013.01); *A01K 29/00* (2013.01); *A61H 3/061* (2013.01); *G01C 21/005* (2013.01); *A61H 2003/063* (2013.01); *A61H 2201/1604* (2013.01); *A61H 2201/165* (2013.01); *A61H 2201/1609* (2013.01);
(Continued)

(58) Field of Classification Search
CPC ............................ A01K 15/021; A01K 27/009
USPC .......................................... 119/712, 719, 720
See application file for complete search history.

(56) References Cited

U.S. PATENT DOCUMENTS

| 4,215,490 A | 8/1980 | Fewell |
| 5,047,952 A | 9/1991 | Kramer et al. |

(Continued)

FOREIGN PATENT DOCUMENTS

| CN | 201036605 | 3/2008 |
| CN | 201251445 | 6/2009 |

(Continued)

OTHER PUBLICATIONS

Kishor Vijay Patil; "A Review on Voice Based Passenger Bus Predicting Arrival of Bus for Easy Navigation of Blind"; URL: http://www.ijmetmr.com/olseptember2015/KishorVijayPatil-A-43; Publication: International Journal & Magazine of Engineering, Technology, Management and Research, Sep. 2015, pp. 1384-1390, vol. No. 2, Issue No. 9.

(Continued)

*Primary Examiner* — David J Parsley
(74) *Attorney, Agent, or Firm* — Dinsmore & Shohl LLP (57) ABSTRACT

Systems and methods for communicating with a guide animal are provided. One embodiment of a method includes determining a first command to provide to a user to proceed to a destination, determining a second command to provide to the guide animal to correspond with the first command, and outputting the first command to direct the user toward the destination. Some embodiments include outputting the second command to direct the guide animal toward the destination, where the second command is outputted to be imperceptible by the user but is perceptible by the guide animal.

8 Claims, 5 Drawing Sheets

(51) Int. Cl.
*A01K 29/00* (2006.01)
*G01C 21/00* (2006.01)
*A61H 3/06* (2006.01)

(52) U.S. Cl.
CPC ............... *A61H 2201/1614* (2013.01); *A61H 2201/5012* (2013.01); *A61H 2201/5048* (2013.01); *A61H 2201/5058* (2013.01); *A61H 2201/5092* (2013.01); *A61H 2201/5097* (2013.01)

(56) References Cited

U.S. PATENT DOCUMENTS

| | | | | |
|---|---|---|---|---|
| 6,232,880 | B1* | 5/2001 | Anderson | A01K 15/023 119/421 |
| 7,446,669 | B2 | 11/2008 | Liebermann | |
| 7,864,991 | B2 | 1/2011 | Espenlaub et al. | |
| 8,606,316 | B2 | 12/2013 | Evanitsky | |
| 8,955,462 | B1* | 2/2015 | Golden | A01K 11/008 119/721 |
| 9,111,545 | B2 | 8/2015 | Jadhav et al. | |
| 2002/0046713 | A1* | 4/2002 | Otto | A01K 15/021 119/720 |
| 2007/0018890 | A1 | 1/2007 | Kulyukin | |
| 2010/0263603 | A1 | 10/2010 | Baron | |
| 2011/0307172 | A1 | 12/2011 | Jadhav et al. | |
| 2014/0266571 | A1 | 9/2014 | Sharma et al. | |
| 2016/0100552 | A1* | 4/2016 | So | A01K 15/021 119/719 |

FOREIGN PATENT DOCUMENTS

| | | |
|---|---|---|
| CN | 103226018 | 7/2013 |
| CN | 103413456 | 11/2013 |
| CN | 203619858 | 6/2014 |
| KR | 2015088056 | 7/2015 |
| WO | 2008015375 | 2/2008 |

OTHER PUBLICATIONS

Outreach website; URL: http://www.outreach1.org/paratransit/para_mainpage.html.

Santa Clara Valley Transportation Authority website; URL: http://www.vta.org/flex.

http://www.humanware.com/en-usa/products/deafblind_communication_solutions/deafblind_communicator, Deaf Blind Communicator; 3 pages, accessed Jan. 4, 2016.

* cited by examiner

SYSTEMS AND METHODS FOR COMMUNICATING WITH A GUIDE ANIMAL

TECHNICAL FIELD

Embodiments described herein generally relate to communicating with a guide animal and, more specifically, to a vision-assist apparatus that communicates with a guide animal.

BACKGROUND

Oftentimes visually impaired persons choose not to use a guide animal (such as a guide dog) because they often do not remember the traditional commands for effectively using the guide animal or are uncomfortable speaking to a guide animal in public. While the guide animal may be effective when properly trained, current solutions require training of the person, as well as the dog to provide effective communication between the two. Additionally, even well trained guide animals may not be aware of all obstacles and dangers along a route to a destination. Thus, a need exists in the industry.

SUMMARY

Systems and methods for communicating with a guide animal are provided. One embodiment of a method includes determining a first command to provide to a user to proceed to a destination, determining a second command to provide to the guide animal to correspond with the first command, and outputting the first command to direct the user toward the destination. Some embodiments include outputting the second command to direct the guide animal toward the destination, where the second command is outputted to be imperceptible by the user but is perceptible by the guide animal.

In another embodiment, a system includes a first output device that provides a first output type that is perceptible by a vision-impaired user and a second output device that outputs a second output type that is imperceptible by the vision-impaired user but is perceptible by the guide animal utilized by the vision-impaired user. Embodiments of the system may also include a vision-assist computing device that includes a processor and a memory component. The memory component may store logic that causes the vision-assist computing device to determine instructions to a destination, determine a first command to provide to the vision-impaired user to proceed to the destination, and determine a second command to provide to the guide animal to correspond with the first command. In some embodiments, the logic causes the system to provide the first command via the first output device and provide the second command via the second output device.

In yet another embodiment, a system includes a vision-assist apparatus that includes a vision-assist apparatus that includes an output device that provides a first output type that is perceptible by a vision-impaired user and a vision-assist computing device comprising a processor and a memory component, the memory component storing logic that causes the vision-assist apparatus to determine directions to a destination, determine a first command to provide to the vision-impaired user to proceed to the destination, and determine a second command to provide to the guide animal to correspond with the first command. In some embodiments, the logic causes the vision-assist apparatus to output the first command via the first output device and provide data related to the second command to a guide animal apparatus. In some embodiments, the data is received by the guide animal apparatus, where the guide animal apparatus includes a guide animal output device. In some embodiments, the second command is output via the guide animal output device.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for communicating with a guide animal. Some embodiments are directed to utilizing a vision-assist apparatus to more effectively communicate information to which the guide animal might not otherwise be aware. As an example, the vision-assist apparatus may include a transducer, a speaker, and a tactile output device. The transducer may be configured to output high frequency signals that are imperceptible by a user, such as a vision-impaired user, but may be recognized by the guide animal. The high frequency signals correspond with the guide animal's training and may also correspond with tactile output from the tactile output device and/or lower frequency audio outputs provided to the user for navigating an environment. In some embodiments, the guide animal may have a collar or harness that includes a tactile output device that communicates with the vision-assist apparatus to provide tactile commands to the guide animal that coincide with the commands provided to the user.

Additionally, some embodiments may be configured for training the guide animal or the user of the vision-assist apparatus. As an example, the guide animal may be trained with traditional commands, as well as human inaudible high frequency signals that instruct the animal. Similarly, the vision-assist apparatus may also include sensors to determine the traditional commands that are provided to the guide animal by the user. When the user is using the vision-assist apparatus, the user may provide traditional commands to the guide animal. If a command provided by the user does not match the desired action for the guide animal (and thus the inaudible command from the vision-assist apparatus), output may be provided to the user for instructing that the command was incorrect and providing an indication of the correct command.

Figure 1:
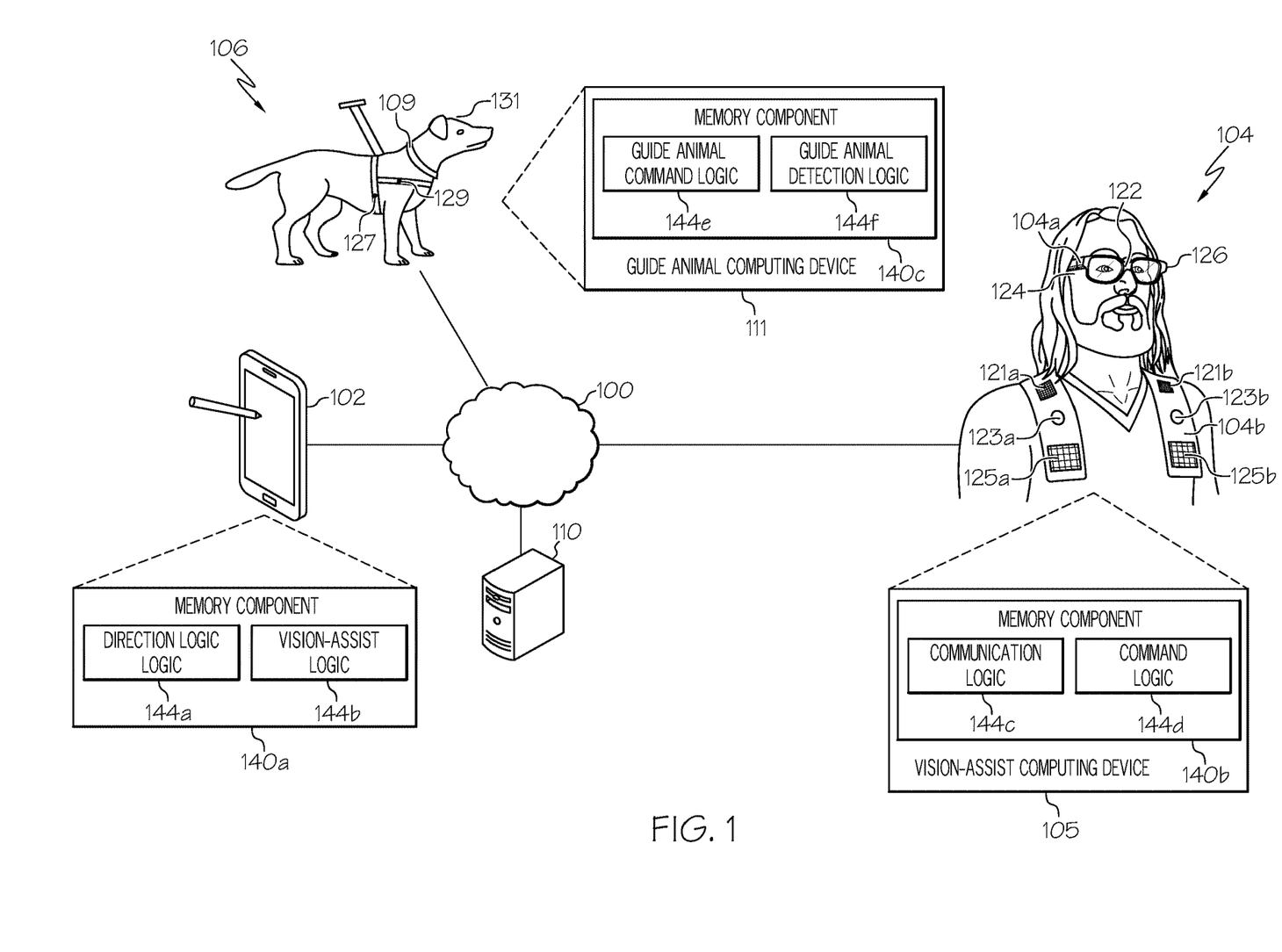
FIG. 1 depicts a communication environment for communicating with a guide animal, according to embodiments described herein.

Referring now to the drawings, FIG. 1 depicts a communication environment for communicating with a guide animal 106, according to embodiments described herein. As illustrated, the communication environment may include a network 100, which is coupled to a user computing device 102, a vision-assist apparatus 104, a guide animal apparatus 109, and a remote computing device 110. The network 100 may include a wide area network, such as the internet, a public switched telephone network, a cellular network, and the like. Similarly, the network 100 may include a local area network, such as a wireless fidelity network, an Ethernet, a Bluetooth network, a Zigbee network, and the like.

Coupled to the network 100 is the user computing device 102, which may include a memory component 140a that stores direction logic 144a and vision-assist logic 144b. As described in more detail below, the direction logic 144a may cause the user computing device 102 to receive global positioning data and/or other data and determine directions and/or a route to a destination. The vision-assist logic 144b may be configured as a mobile application and may cause the user computing device 102 to communicate with the vision-assist apparatus 104 to provide location data, user preferences for the vision-assist apparatus 104 and/or the guide animal apparatus 109. The communication between the user computing device 102 and the vision-assist apparatus 104 my include data related to directions, destinations, and/or commands that may be provided by the vision-assist apparatus 104 to the user and/or guide animal 106.

The vision-assist apparatus 104 may include a vision-assist computing device 105 and a memory component 140b for communicating with a guide animal 106 and/or guide animal apparatus 109. The vision-assist apparatus 104 may include a necklace module 104a and/or an eyeglass module 104b. The eyeglass module 104b may include at least one camera 122 (such as an eye tracking camera and/or environment camera), at least one speaker 124, and/or at least one tactile output device 126. Similarly, the necklace module 104a may include at least one camera 121a, 121b (such as an eye tracking camera and/or an environment camera), at least one speaker 123a, 123b (such as an audible speaker and/or a high frequency speaker), and/or at least one tactile output device 125a, 125b. The vision-assist apparatus 104 may also include one or more inertial measurement units, tactile input hardware, one or more microphones, one or more tactile feedback devices, one or more location sensors, one or more lights, one or more proximity sensors, one or more batteries, one or more charging ports, global positioning hardware, and/or other hardware or software.

It should also be understood that while the vision-assist apparatus 104 is depicted in FIG. 1 as including the eyeglass module 104b and/or the necklace module 104a, this is just an example. Some embodiments may be configured as a bracelet, handheld device, clothing, headset, etc.

As described in more detail below, the speakers 123a, 123b, 124 may be configured for providing audio output in the audible frequency range for humans (such as from about 20 Hertz to about 20 Kilohertz). Additionally, at least one of the speakers 123a, 123b, 124 may be configured to output signals in the inaudible frequency range for humans, but in the audible frequency range for the respective guide animal 106. As an example, if the guide animal 106 is a canine, the frequency range of the inaudible output may reside from about 23 Kilohertz to about 64 Kilohertz, such that the guide animal 106 may perceive the command, but the user (and other persons) cannot. In some embodiments, the same speaker may provide both the user-perceptible output (e.g., a first output type) and the user-imperceptible output (e.g., a second output type). In some embodiments, different speakers are dedicated to the different types of audio outputs described herein.

Also included with the vision-assist apparatus 104 is a vision-assist computing device 105. The vision-assist computing device 105 may include a memory component 140b, which stores communication logic 144c and command logic 144d. The communication logic 144c may cause the vision-assist apparatus 104 to communicate with the user computing device 102, the guide animal apparatus 109, and/or the remote computing device 110 to request instructions and/or receive instructions related to an environment or destination. The command logic 144d may cause the vision-assist apparatus 104 to provide audible, inaudible, and/or tactile instructions to the user and/or guide animal 106. These and other hardware and software components are described in more detail below. The vision-assist apparatus 104 may also include wireless communication hardware and software for communicating with the guide animal apparatus 109.

The guide animal 106 may include a canine (dog), ferret, pig, monkey, and/or other animal for guiding the user to a destination. As such, the guide animal apparatus 109 may be configured as a collar, harness, leash, and/or may be a stand-alone device and may provide a tactile output and/or audio output (e.g., a human perceptible and/or a human imperceptible output) to the guide animal 106. Accordingly the guide animal apparatus 109 may include a guide animal speaker 127, a guide animal tactile output device 129, and/or a guide animal visual output device 131 (which may be attached to the head of the guide animal 106, or otherwise placed within the peripheral vision of the guide animal 106) to provide audio, tactile, and/or visual representations of commands to the guide animal 106.

Additionally, the guide animal apparatus 109 may include a guide animal computing device 111 that contains a memory component 140c. The memory component 140c may store guide animal command logic 144e and guide animal detection logic 144f. The guide animal command logic 144f may be configured to cause the guide animal computing device 111 to communicate with the vision-assist apparatus 104 for coordinating the timing of first commands, which may include commands provided to the user, with second commands, which may be provided to the guide animal 106. The guide animal detection logic 144f may cause the guide animal computing device 111 to detect actions of the guide animal 106 and/or the user for training purposes and route calculation.

Accordingly, some embodiments may be configured for the vision-assist apparatus 104 to communicate with the guide animal apparatus 109 such that the guide animal apparatus 109 communicates with the guide animal 106. As such, the guide animal apparatus 109 may include wireless communication hardware and/or software, a power source, a guide animal tactile output device 129, a guide animal speaker 127, and/or components that are coupled to the guide animal computing device 111. In these embodiments, the vision-assist apparatus 104 may provide audible and/or tactile commands to the user and wirelessly communicate with the guide animal apparatus 109, which provides commands to the guide animal 106. Based on the data received from the vision-assist apparatus 104, the guide animal apparatus 109 may provide the tactile and/or audio output to the guide animal 106.

Also coupled to the network 100 is a remote computing device 110. The remote computing device 110 may be configured as a mapping server, a global positioning server, a command server, and the like. It should be understood that the depiction of the remote computing device 110 in FIG. 1 as a single computing device is merely for simplicity. Any number of computing devices for providing mapping data, routing data, command data, and the like may be utilized.

Figure 2:
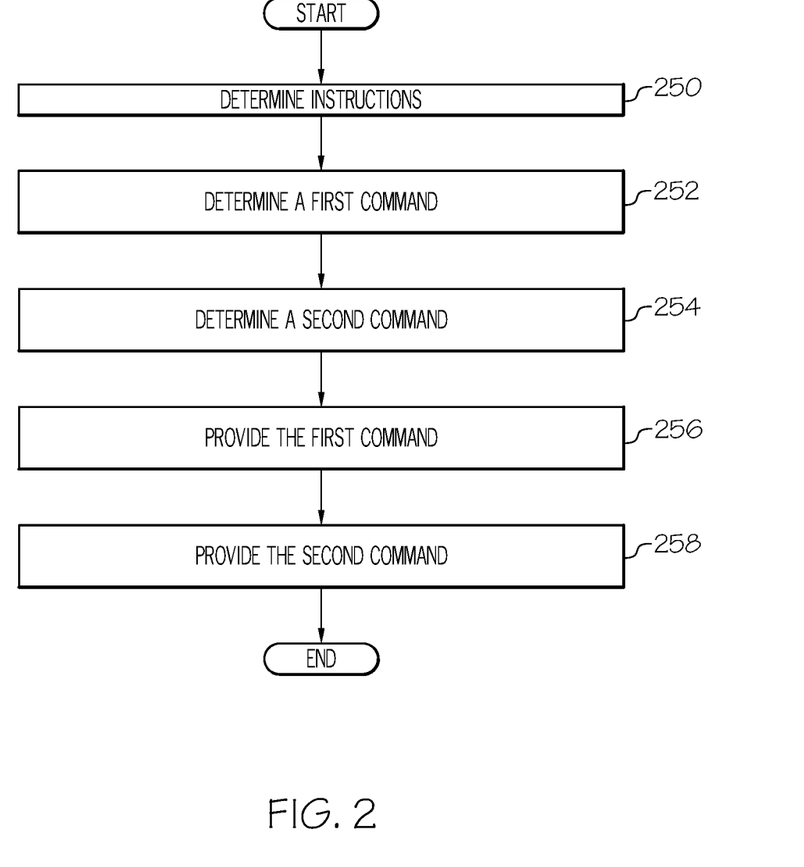
FIG. 2 depicts a flowchart for communicating with a guide animal, according to embodiments described herein.

FIG. 2 depicts a flowchart for communicating with a guide animal 106, according to embodiments described herein. As illustrated in block 250, instructions to a destination may be received. Specifically, the user may identify a destination via a voice command to the vision-assist apparatus 104 and/or to the user computing device 102. In embodiments where the vision-assist apparatus 104 receives the destination from the user, the vision-assist apparatus 104 may determine a current position of the user and communicate with the user computing device 102 to determine the instructions to reach the destination. The user computing device 102 may communicate with the remote computing device 110 to receive mapping data and/or routing data to guide the user and guide animal 106 to the destination from the current position. Similarly, some embodiments may be configured such that the vision-assist apparatus 104 communicates directly with the remote computing device 110 to receive this data.

Regardless, in block 252, a first command may be determined to provide the user with instructions to proceed to the destination. Specifically, upon receiving the directions to a destination, the vision-assist apparatus 104 and/or the user computing device 102 may determine a command for providing to the user and/or guide animal 106. Specifically, the vision-assist apparatus 104 and/or the user computing device 102 may determine an audible and/or tactile command that the user can perceive. The first command may include an instruction, such as a right turn instruction, a left turn instruction, a stop instruction, a proceed instruction, and/or other instructions. As described above, the first command may be provided by the tactile output device 125a, 125b, 126 and/or the speaker 123a, 123b, 124. Additionally, in some embodiments at least a portion of the first command may be provided by the user computing device 102.

In block 254, a second command may be determined to be provided to the guide animal 106, where the second command corresponds with the first command. Specifically, the second command that is provided may be inaudible to the user, but in the audible range for the guide animal 106. Additionally, the second command may communicate similar information as the first command. As an example, the guide animal 106 may be trained to respond to the inaudible commands provided by the vision-assist apparatus 104. As a result, if the instructions include a command to take a left turn, the user may be provided with the first command, such as audible and/or tactile commands indicating that the user should turn left in 20 feet. Accordingly, the second command may convey the same information to the guide animal 106, but may be timed such that the guide animal 106 will know exactly when to turn, thereby coordinating the timing of the first command and second command.

As illustrated in block 256, the first command may be provided via the first output device. As described above, the first command may be provided in an audible frequency range for the user to perceive the command and/or may be provided as a tactile output. Accordingly, the first command may be formatted for the user to traverse a predetermined route and reach the destination.

It should be understood that the user-perceptible output may be configured based on a user preference, an environmental factor, etc. As an example, the user may prefer tactile output in certain locations and/or areas of high human congestion. Similarly, some embodiments may configured to determine an environmental noise level and adjust the volume of the audio commands accordingly. In some embodiments, tactile output may be provided in response to a determination that the environmental noise is above a predetermined threshold.

As illustrated in block 258, the second command may be provided via a second output device. As described above, the second output device may be a speaker 123a, 123b, 124 or other device for producing a sound that is inaudible by the user, but is perceptible by the guide animal 106. Additionally, the second output may be timed such that the first command and the second command may be provided at different times, but coordinated to appropriately instruct the user and the guide animal 106. As an example, the first command may indicate that a right turn should be made in 20 feet. However, the second command may instruct the guide animal 106 to take an immediate right turn. As such, the second command in this example may be provided after the first command. It should be understood that, depending on the embodiment, not every command that is provided to the user is also provided to the guide animal (and vice versa).

It should also be understood that the second command may be configured based on one or more external factors, such as user preference, environment, training, and the like. As an example, some embodiments may be provided such that the speaker 123a outputs an inaudible beep for right turns, speaker 123b outputs an inaudible beep for left turns, and the speaker 124 may be utilized for start and stop commands. Because the outputs originate from a predetermined source, the guide animal 106 may detect the source of the output and understand the command. Some embodiments, however, my provide different outputs, based on the command. As an example, a single inaudible beep may indicate a right turn command, with a double inaudible beep may indicate a left turn command.

Similarly, some embodiments may be configured to determine environmental noise and customize the inaudible output accordingly. As an example, the vision-assist apparatus 104 may determine that the guide animal 106 is located on the right of the user and detect environmental noise on the left of the user. As such, the vision-assist apparatus 104 may bias the output to the speaker 123a.

It should also be understood that some embodiments may be configured to detect unexpected obstacles on the route and provide at least one improvisational command for the user and guide animal 106 to avoid the obstacles and continue to the destination. As an example, the camera 121a, 121b, 122 and/or other device on the vision-assist apparatus 104 may detect the unexpected obstacle, a current location of the unexpected obstacle, and a predicted path (if any) of the unexpected obstacle. Accordingly, the vision-assist apparatus 104 may determine a command (or series of commands) for avoiding the unexpected obstacle. The vision-assist apparatus 104 may additionally provide a first command and second command to the user and guide animal 106, respectively. The vision-assist apparatus 104 may then resume providing commands to the user and guide animal 106 to reach the destination.

It should be understood that some embodiments may operate without a predetermined destination being established and/or may operate with additional functionality. Specifically, embodiments of the vision-assist apparatus 104 may detect an obstacle and may alert the user and/or guide animal 106 accordingly. The alert for the user may include an identification of the obstruction and/or a command, while the guide animal 106 may be provided with a command.

Figure 3:
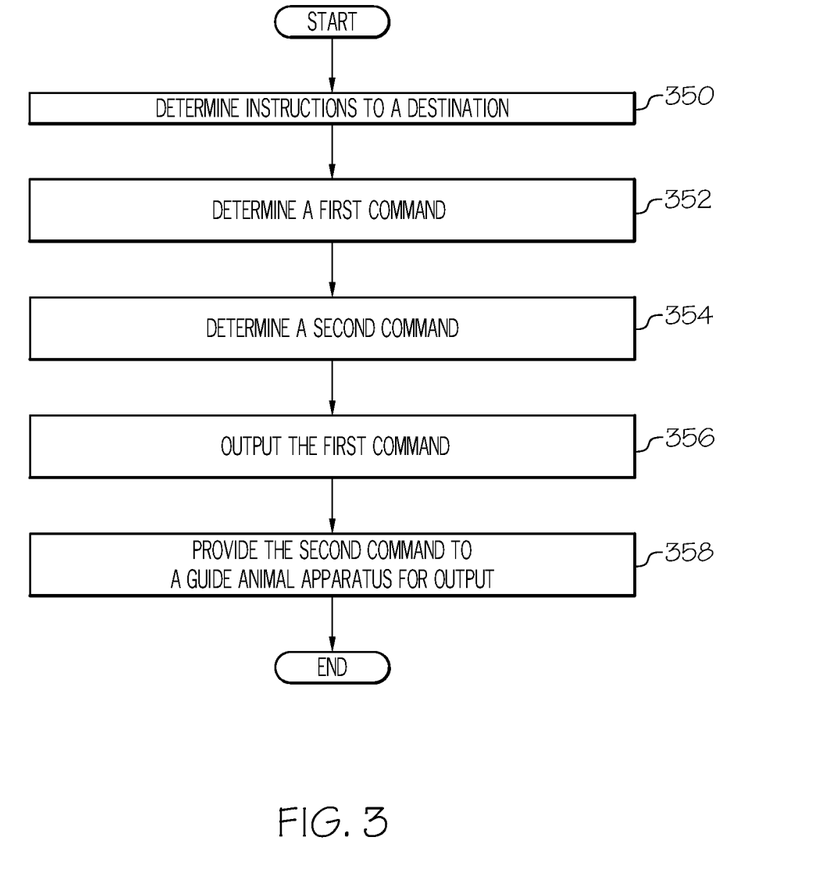
FIG. 3 depicts a flowchart for utilizing a vision-assist apparatus and a guide animal apparatus to communicate with a guide animal, according to embodiments described herein.

FIG. 3 depicts a flowchart for utilizing a vision-assist apparatus 104 and a guide animal apparatus 109 to communicate with a guide animal 106, according to embodiments described herein. As illustrated in block 350, instructions to a destination may be determined. These instructions may be determined by the vision-assist apparatus 104 and/or may be determined via communication of the vision-assist apparatus 104 with the user computing device 102 and/or the remote computing device 110.

Regardless, in block 352, a first command may be determined. The first command may be a command that is provided for the user to reach the destination. In block 354, a second command may be determined. The second command may be a command for the guide animal 106 to reach the destination. In block 356, the first command may be output via a user-perceptible audio signal and/or a tactile output provided by the vision-assist apparatus 104. In block 358 the second command may be provided to the guide animal apparatus 109 for the guide animal apparatus 109 to output. As discussed above, the guide animal apparatus 109 may provide tactile output to the guide animal 106, audio output (which may be user perceptible or user imperceptible), and/or visual output to the guide animal 106, depending on the particular embodiment.

It should also be understood that while the embodiment of FIG. 3 depicts that the guide animal apparatus 109 provides the commands to the guide animal 106, this is just an example. Some embodiments may be provided such that the vision-assist apparatus 104 provides one or more commands to the guide animal 106 and/or the guide animal apparatus 109 provides commands to the user.

Figure 4:
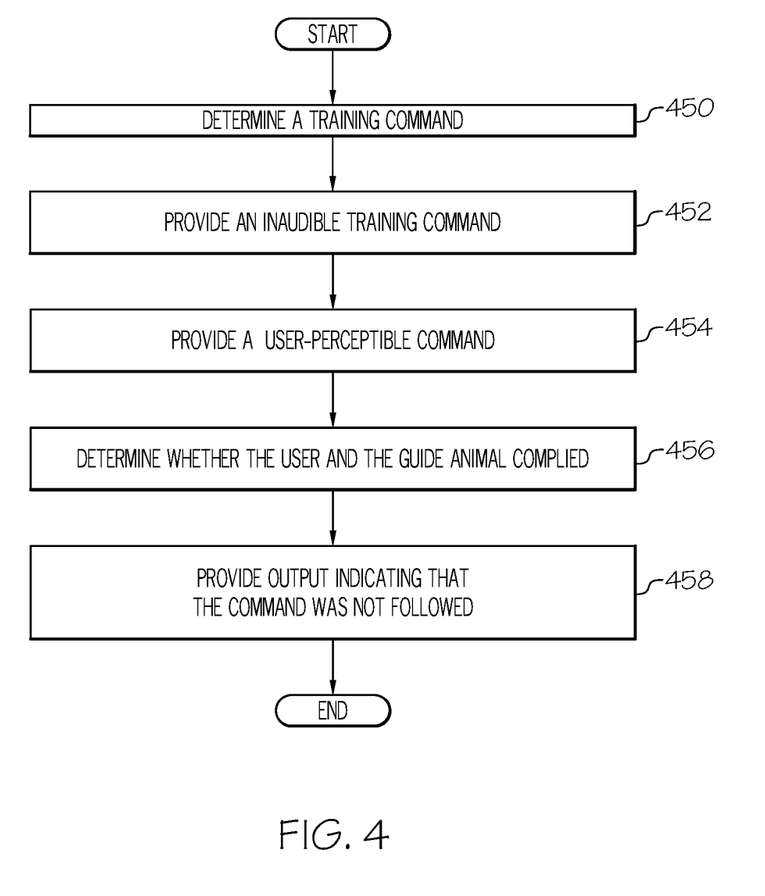
FIG. 4 depicts a flowchart for training a guide animal, according to embodiments described herein.

FIG. 4 depicts a flowchart for training a guide animal 106, according to embodiments described herein. As illustrated in block 450, a training command (such as a first training command) may be determined. Specifically, when there is a desire to train the user and/or guide animal 106, a training command may be determined. The training command may include an instruction (such as to turn left), as well as the audible command that is provided to the user (such as "turn left"), the corresponding tactile command that is provided to the user (such as a double tap by the tactile output device 125*b*), and the inaudible command that is provided to the guide animal 106 (such as an inaudible double beep from the speaker 123*b*.

Once the training command is determined, in block 452, an inaudible training command (such as a second training command) is provided to the guide animal 106. In block 454, user-perceptible command is provided to the user. Depending on the particular training selected, the user-perceptible command may include audible and/or tactile output. In block 456, a determination regarding whether the user and the guide animal 106 complied with the training command may be determined. The determination may be made by the vision-assist apparatus 104, which may track movement and/or change of position of the user. In block 458, in response to determining that the user and/or guide animal 106 did not comply with the command, output indicating that the noncompliance may be provided. As an example, if it is determined that the user did not comply with the command, the speaker 123*a*, 123*b*, 124 may provide an indication to the user of the error and/or a manner to correct the user. Similarly, if it is determined that the guide animal 106 did not comply with the command, the vision-assist apparatus 104 may provide the user with instructions on a manner to train the guide animal 106 to correct the error.

Figure 5:
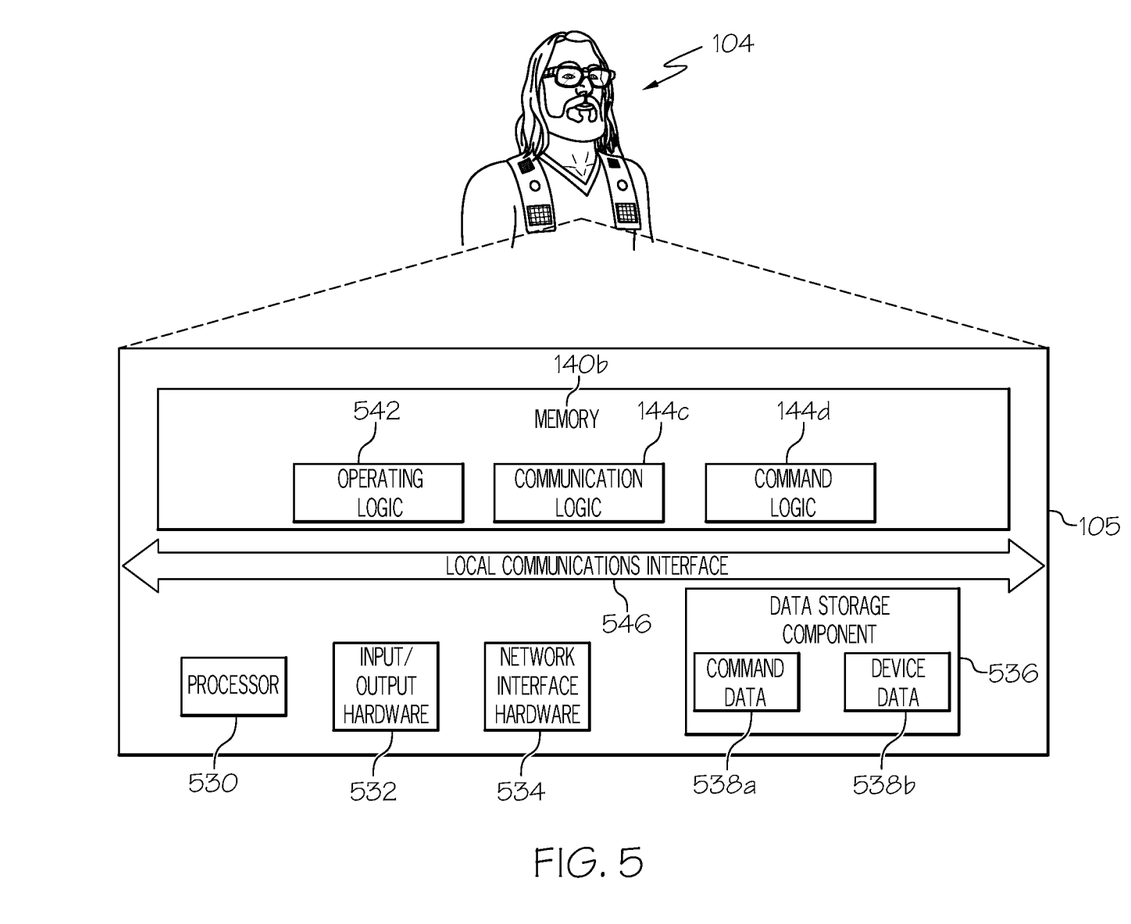
FIG. 5 depicts computing infrastructure for communicating with a guide animal, according to embodiments described herein.

FIG. 5 depicts computing infrastructure for communicating with a guide animal 106, according to embodiments described herein. The vision-assist computing device 105 includes a processor 530, input/output hardware 532, network interface hardware 534, a data storage component 536 (which stores command data 538*a*, device data 538*b*, and/or other data), and the memory component 140*b*. The memory component 140*b* may be configured as volatile and/or non-volatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vision-assist computing device 105 and/or external to the vision-assist computing device 105.

The memory component 140*b* may store operating system logic 542, the communication logic 144*c* and the command logic 144*d*. The communication logic 144*c* and the command logic 144*d* may each include a plurality of different pieces of logic, each of which may be embodied as a computer program, firmware, and/or hardware, as an example. A local communications interface 546 is also included in FIG. 5 and may be implemented as a bus or other communication interface to facilitate communication among the components of the vision-assist computing device 105.

The processor 530 may include any processing component operable to receive and execute instructions (such as from a data storage component 536 and/or the memory component 140). As described above, the input/output hardware 532 may include and/or be configured to interface with the components of FIGS. 1 and/or 5, including the cameras 121*a*, 121*b*, 122, speakers 123*a*, 123*b*, 124, tactile output devices 125*a*, 125*b*, 126, one or more inertial measurement units, tactile input hardware, one or more microphones, one or more tactile feedback devices, one or more location sensors, one or more lights, one or more proximity sensors, one or more batteries, one or more charging ports, global positioning hardware, which may be included with the vision-assist apparatus 104.

The network interface hardware 534 may include and/or be configured for communicating with any wired or wireless networking hardware, including an antenna, a modem, a LAN port, wireless fidelity (Wi-Fi) card, WiMax card, Bluetooth™ module, mobile communications hardware, and/or other hardware for communicating with other networks and/or devices. From this connection, communication may be facilitated between the vision-assist computing device 105 and other computing devices (such as user computing device 102 and/or the remote computing device 110).

The operating system logic 542 may include an operating system and/or other software for managing components of the vision-assist computing device 105. As discussed above, the communication logic 144*c* may reside in the memory component 140*b* and may be configured to cause the processor 530 to receive environmental data, as well as data from the user, the user computing device 102, and/or the remote computing device 110 and determine a destination and/or route accordingly. Similarly, the command logic 144*d* may be utilized to provide human perceptible and/or human imperceptible commands for the user and/or guide animal 106.

It should be understood that while the components in FIG. 5 are illustrated as residing within the vision-assist computing device 105, this is merely an example. In some embodiments, one or more of the components may reside external to the vision-assist computing device 105. It should also be understood that, while the vision-assist computing device 105 is illustrated as a single device, this is also merely an example. In some embodiments, the communication logic 144c and the command logic 144d may reside on different computing devices. As an example, one or more of the functionalities and/or components described herein may be provided by the user computing device 102 and/or other devices, which may be communicatively coupled to the vision-assist computing device 105. These computing devices may also include hardware and/or software for performing the functionality described herein.

Additionally, while the vision-assist computing device 105 is illustrated with the communication logic 144c and the command logic 144d as separate logical components, this is also an example. In some embodiments, a single piece of logic may cause the vision-assist computing device 105 to provide the described functionality.

As illustrated above, various embodiments for training a guide animal 106 are disclosed. Accordingly, embodiments described herein may encourage vision-impaired persons to use a guide animal 106 for traversing a route to a destination. Additionally, embodiments described herein may be configured to facilitate training of a user and/or guide animal 106 for use with a vision-assist apparatus 104.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for communicating with a guide animal. It should also be understood that these embodiments are merely exemplary and are not intended to limit the scope of this disclosure.

What is claimed is:

1. A system for communicating with a guide animal, comprising:
a first output device that provides a first output type that is perceptible by a vision-impaired user;
a second output device that outputs a second output type that is imperceptible by the vision-impaired user but is perceptible by the guide animal utilized by the vision-impaired user; and
a vision-assist computing device comprising a processor and a memory component, the memory component storing logic that causes the vision-assist computing device to perform at least the following:
determine instructions to a destination;
determine a first command to provide to the vision-impaired user to proceed to the destination;
determine a second command to provide to the guide animal to correspond with the first command;
provide the first command via the first output device; and
provide the second command via the second output device.

2. The system of claim 1, wherein the first output device includes at least one of the following: a tactile output device and a speaker.

3. The system of claim 1, further comprising a user computing device that communicates with the vision-assist computing device to provide routing data associated with the destination.

4. The system of claim 1, wherein the logic further causes the vision-assist computing device to determine a manner of outputting the first command, wherein the manner of outputting includes at least one of the following: a user preference and an environmental factor.

5. The system of claim 1, wherein the logic further causes the vision-assist computing device to train at least one of the following: the vision-impaired user and the guide animal, and wherein training includes determining whether a training command was followed and, in response to determining that the training command was not followed, providing an output to indicate that the training command was not followed.

6. The system of claim 1, further comprising a guide animal apparatus that includes a guide animal tactile output device and a guide animal speaker.

7. The system of claim 6, wherein the guide animal apparatus receives the second command and outputs the second command via at least one of the following: the guide animal tactile output device and the guide animal speaker.

8. The system of claim 1, wherein the logic further causes the system to perform at least the following:
determine an unexpected obstacle on a route a user is taking to the destination; and
provide at least one improvisational command for the user and the guide animal to avoid the unexpected obstacle and continue to the destination.

* * * * *

UNITED STATES PATENT AND TRADEMARK OFFICE
CERTIFICATE OF CORRECTION

PATENT NO. : 10,912,281 B2  
APPLICATION NO. : 15/052495  
DATED : February 9, 2021  
INVENTOR(S) : Rajiv Dayal and Fredrick W. Mau, II Page 1 of 1

It is certified that error appears in the above-identified patent and that said Letters Patent is hereby corrected as shown below:

In the Drawings

In drawing sheet 1 of 5, figure 1, after "DIRECTION LOGIC", delete "LOGIC" of "  ".

Signed and Sealed this  
Thirteenth Day of April, 2021

Drew Hirshfeld  
*Performing the Functions and Duties of the  
Under Secretary of Commerce for Intellectual Property and  
Director of the United States Patent and Trademark Office*